United States Patent
Zhang

(10) Patent No.: US 9,350,583 B2
(45) Date of Patent: May 24, 2016

(54) METHOD AND APPARATUS FOR AUTOMATICALLY DETECTING A PHYSICAL LAYER (PHY) MODE OF A DATA UNIT IN A WIRELESS LOCAL AREA NETWORK (WLAN)

(71) Applicant: MARVELL WORLD TRADE LTD., St. Michael (BB)

(72) Inventor: Hongyuan Zhang, Fremont, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 182 days.

(21) Appl. No.: 13/661,423

(22) Filed: Oct. 26, 2012

(65) Prior Publication Data

US 2013/0107893 A1    May 2, 2013

Related U.S. Application Data

(60) Provisional application No. 61/554,872, filed on Nov. 2, 2011.

(51) Int. Cl.
| | |
|---|---|
| *H04L 27/26* | (2006.01) |
| *H04L 1/00* | (2006.01) |
| *H04L 5/00* | (2006.01) |

(52) U.S. Cl.
CPC .............. *H04L 27/2613* (2013.01); *H04L 1/00* (2013.01); *H04L 5/0007* (2013.01); *H04L 5/0023* (2013.01); *H04L 5/0048* (2013.01); *H04L 5/0064* (2013.01); *H04L 27/2602* (2013.01)

(58) Field of Classification Search
CPC ..... H04L 27/2613; H04L 1/00; H04L 5/0007; H04L 5/0023; H04L 5/0048; H04L 5/0064; H04L 27/2602

USPC .......... 370/350, 208, 328; 455/316, 260, 222, 455/295

See application file for complete search history.

(56) References Cited

U.S. PATENT DOCUMENTS

| | | | |
|---|---|---|---|
| 7,599,332 B2 | 10/2009 | Zelst et al. | |
| 7,742,390 B2 | 6/2010 | Mujtaba | |
| 8,155,138 B2 | 4/2012 | van Nee | |
| 8,289,869 B2 | 10/2012 | Sawai | |
| 8,339,978 B2 | 12/2012 | Sawai et al. | |
| 8,427,933 B2 * | 4/2013 | Schelstraete et al. | 370/201 |
| 8,526,351 B2 | 9/2013 | Fischer et al. | |

(Continued)

FOREIGN PATENT DOCUMENTS

WO    WO-2012/122119 A1    9/2012

OTHER PUBLICATIONS

International Search Report and Written Opinion in corresponding PCT/US2012/062039 mailed Feb. 4, 2013.

(Continued)

*Primary Examiner* — Chandrahas Patel

(57) ABSTRACT

In a method for generating a physical layer (PHY) data unit for transmission via a communication channel, the data unit is generated to include a first long training field when the data unit is to be transmitted in a normal mode. The data unit is generated to include a second long training field when the data unit is to be transmitted in a low bandwidth mode. The first training field and the second training field are configured such that a receiving device can auto-detect whether the data unit corresponds to the low bandwidth mode or the normal mode.

20 Claims, 8 Drawing Sheets

(56) References Cited

U.S. PATENT DOCUMENTS

| | | | |
|---|---|---|---|
| 8,599,804 | B2 | 12/2013 | Erceg et al. |
| 8,619,907 | B2 | 12/2013 | Mujtaba et al. |
| 8,724,720 | B2 | 5/2014 | Srinivasa et al. |
| 8,826,106 | B2 | 9/2014 | Zhang et al. |
| 8,867,653 | B2 | 10/2014 | Zhang et al. |
| 8,948,283 | B2 | 2/2015 | Zhang |
| 8,982,889 | B2 | 3/2015 | Zhang |
| 9,130,727 | B2 | 9/2015 | Zhang et al. |
| 2009/0196163 | A1 | 8/2009 | Du |
| 2010/0046656 | A1 | 2/2010 | van Nee et al. |
| 2010/0260159 | A1 | 10/2010 | Zhang et al. |
| 2011/0002219 | A1 | 1/2011 | Kim et al. |
| 2012/0294294 | A1 | 11/2012 | Zhang |

OTHER PUBLICATIONS van Nee, et al. "The 802.11n MIMO-OFDM Standard for Wireless LAN and Beyond," Wireless Personal Communications, vol. 37, pp. 445-453 (Jun. 2006).

Park, "Proposed Specification Framework for TGah", *The Institute of Electrical and Electronics Engineers*, doc. No. IEEE 802.11-11/1137r11, (Sep. 2012).

Vermani, et al. "Preamble Format for 1 MHz," *The Institute of Electrical and Electronics Engineers*, doc. No. IEEE 802.11-11/1482r2, (Nov. 2011).

S. A. Mujtaba, "IEEE P802.11—Wireless LANs, TGn Sync Proposal Technical Specification," The Institute of Electrical and Electronics Engineers, Inc., doc.: IEEE 802.11-04/0889r6, May 2005.

Stacey et al., "IEEE P802.11, Wireless LANs, Proposed TGac Draft Amendment," Institute of Electrical and Electronics Engineers, doc. No. IEEE 802.11-10, 1361 r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Shi et al., "Phase Tracking During VHT-LTF," Doc. No. IEEE 802.11-10, 0771 r0, *The Institute of Electrical and Electronics Engineers, Inc.*, Jul. 2010.

van Zelst et al., "Pilot Sequence for VHT-DATA," Doc. No. IEEE 802.11-10, 0811 r1, *The Institute of Electrical and Electronics Engineers, Inc.*, Jul. 2010.

Yu, et al. "Coverage extension for IEEE802.11ah," The Institute of Electrical and Electronics Engineers, doc. No. IEEE 802.11-11/0035r1, (Jan. 2011).

Taghavi et al., "Introductory Submission for TGah", doc. No. IEEE 802.11-11/0062r0, Institute for Electrical and Electronics Engineers, pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Zhang et al., "11ah Data Transmission Flow," The Institute of Electrical and Electronics Engineers, doc. No. IEEE 802.11-11/1484r1, (Nov. 2011).

Park, "Proposed Specification Framework for TGah D9.x", The Institute of Electrical and Electronics Engineers, doc. No. IEEE 802.11-yy/xxxxr0, (Jul. 2012).

Zhang et al., "1MHz Waveform in Wider BW ", The Institute of Electrical and Electronics Engineers, doc. No. IEEE 802.11-12/0309r1, (Mar. 2012).

Vermani, et al. "Spec Framework Text for PHY Numerology," The Institute of Electrical and Electronics Engineers, doc. No. IEEE 802.11-11/1311 r0, (Sep. 2011).

International Preliminary Report on Patentability for International Application No. PCT/US2012/062039, mailed May 6, 2014.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Park, "Proposed Specification Framework for TGah", *The Institute of Electrical and Electronics Engineers*, doc. No. IEEE 802.11-11/1137r6, (Mar. 2012).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

IEEE Std 802.11g/D8.2, Apr 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE Std. 802.11 nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

(56) References Cited

OTHER PUBLICATIONS

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

Chen, "Home Network Basis: Transmission Environments and Wired/Wireless Protocols," *Prentice Hall*, pp. 1-26 (Jul. 2003).

Hiertz et al., "The IEEE 802.11 Universe," *IEEE Communications Magazine*, pp. 62-70, (Jan. 2010).

Lee et al., "TGaf PHY proposal," *The Institute of Electrical and Electronics Engineers*, doc. No. IEEE 802.11-12/0809r5, pp. 1-43 (Jul. 10, 2012).

Park et al., "Low Power Capability Support for 802.11ah," doc. No. IEEE 802.11-11/0060r1, *The Institute for Electrical and Electronics Engineers*, 7 pages (Jan. 17, 2011).

Park, "Proposed Specification Framework for TGah", *The Institute of Electrical and Electronics Engineers*, doc. No. IEEE 802.11—yy/xxxxr05, (Jan. 2012).

\* cited by examiner

Normal PHY (64FFT)

Low Bandwidth PHY (32FFT)

METHOD AND APPARATUS FOR AUTOMATICALLY DETECTING A PHYSICAL LAYER (PHY) MODE OF A DATA UNIT IN A WIRELESS LOCAL AREA NETWORK (WLAN)

CROSS-REFERENCES TO RELATED APPLICATIONS

This disclosure claims the benefit of U.S. Provisional Patent Application No. 61/554,872, filed on Nov. 2, 2011, the disclosure of which is incorporated herein by reference.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method for generating a physical layer (PHY) data unit for transmission via a communication channel includes generating the data unit to include a first long training field when the data unit is to be transmitted in a normal mode, and generating the data unit to include a second long training field when the data unit is to be transmitted in a low bandwidth mode. The first training field and the second training field are configured such that a receiving device can auto-detect whether the data unit corresponds to the low bandwidth mode or the normal mode.

In other embodiments, the method includes any combination of one or more of the following elements.

Generating the data unit to include the first long training field comprises using a first tone map having a first set of orthogonal frequency division multiplexing (OFDM) tones, wherein the first set of OFDM tones includes i) a first set of data tones, and ii) a first set of pilot tones.

Generating the data unit to include the second training field comprises utilizing a second tone map having a second set of OFDM tones, wherein the second set of OFDM tones includes i) a second set of data tones and ii) a second set of pilot tones.

The first training field and the second training field are configured to have a low cross-correlation value when cross-correlation is performed using a set of considered overlapping tones within the first tone map and the second tone map.

The set of considered overlapping tones excludes one or more of i) the first set of pilot tones, ii) the second set of pilot tones, iii) one or more data tones in the first set of data tones, and iv) one or more data tones in the second set of data tones.

The first set of OFDM tones further includes a first set of zeroed tones.

The second set of OFDM tones further includes a second set of zeroed tones.

The set of considered overlapping tones includes one or more of i) one or more zeroed tones in the first set of zeroed tones and) one or more zeroed tones in the second set of zeroed tones.

The set of considered overlapping tones includes an even number of tones.

In another embodiment, an apparatus for generating a physical layer (PHY) data unit for transmission via a communication channel comprises a network interface configured to generate the data unit to include a first long training field when the data unit is to be transmitted in a low bandwidth mode, and generate the data unit to include a second long training field when the data unit is to be transmitted in a normal mode. The first training field and the second training field are configured such that a receiving device can auto-detect whether the data unit corresponds to the low bandwidth mode or the normal mode.

In other embodiments, the apparatus includes any combination of one or more of the following features.

The network interface is configured to generate the data unit to include the first long training field comprises using a first tone map having a first set of orthogonal frequency division multiplexing (OFDM) tones, wherein the first set of OFDM tones includes i) a first set of data tones, and ii) a first set of pilot tones.

The network interface is configured to generate the data unit to include the second training field comprises utilizing a second tone map having a second set of OFDM tones, wherein the second set of OFDM tones includes i) a second set of data tones and ii) a second set of pilot tones.

The first training field and the second training field are configured to have a low cross-correlation value when cross-correlation is performed using a set of considered overlapping tones within the first tone map and the second tone map.

The set of considered overlapping tones excludes one or more of i) the first set of pilot tones, ii) the second set of pilot tones, iii) one or more data tones in the first set of data tones, and iv) one or more data tones in the second set of data tones.

The first set of OFDM tones further includes a first set of zeroed tones.

The second set of OFDM tones further includes a second set of zeroed tones.

The set of considered overlapping tones includes one or more of i) one or more zeroed tones in the first set of zeroed tones and) one or more zeroed tones in the second set of zeroed tones.

The set of considered overlapping tones includes an even number of tones.

In yet another embodiment, a method includes receiving a data unit, wherein the data unit includes one of i) a first long training field modulated according to a first long training sequence or i) a second training field modulated according to a second training sequence. The method also includes detecting whether the data unit includes the first training field or the second training field. The method further includes determining that the data unit corresponds to a normal mode data unit in response to detecting that the data unit includes the first training field, and determining that the data unit corresponds to a low bandwidth mode data unit in response to detecting that the data unit includes the second training field.

In other embodiments, the method includes any combination of one or more of the following elements.

The first long training field is modulated according to a first tone map having a first set of orthogonal frequency division multiplexing (OFDM) tones, wherein the first set of OFDM tones includes i) a first set of data tones, and ii) a first set of pilot tones.

The second training field is modulated according to a second tone map having a second set of OFDM tones, wherein the second set of OFDM tones includes i) a second set of data tones and ii) a second set of pilot tones.

Detecting whether the data unit includes the first training field or the second training field comprises performing cross-correlation using a set of considered overlapping tones within the first tone map and the second tone map.

The set of considered overlapping tones excludes one or more of i) the first set of pilot tones, ii) the second set of pilot tones, iii) one or more data tones in the first set of data tones, and iv) one or more data tones in the second set of data tones.

The first set of OFDM tones further includes a first set of zeroed tones.

The second set of OFDM tones further includes a second set of zeroed tones.

The set of considered overlapping tones includes one or more of i) one or more zeroed tones in the first set of zeroed tones and) one or more zeroed tones in the second set of zeroed tones.

The set of considered overlapping tones includes an even number of tones.

In still another embodiment, an apparatus comprises a network interface configured to receive a data unit, wherein the data unit includes one of i) a first long training field modulated according to a first long training sequence or i) a second training field modulated according to a second training sequence. The network interface is also configured to detect whether the data unit includes the first training field or the second training field. The network interface is further configured to determine that the data unit corresponds to a normal mode data unit in response to detecting that the data unit includes the first training field, and determine that the data unit corresponds to a low bandwidth mode data unit in response to detecting that the data unit includes the second training field.

In other embodiments, the apparatus includes any combination of one or more of the following elements.

The first long training field is modulated according to a first tone map having a first set of orthogonal frequency division multiplexing (OFDM) tones, wherein the first set of OFDM tones includes i) a first set of data tones, and ii) a first set of pilot tones.

The second training field is modulated according to a second tone map having a second set of OFDM tones, wherein the second set of OFDM tones includes i) a second set of data tones and ii) a second set of pilot tones.

The network interface is configured to detect whether the data unit includes the first training field or the second training field at least by performing cross-correlation using a set of considered overlapping tones within the first tone map and the second tone map.

The set of considered overlapping tones excludes one or more of i) the first set of pilot tones, ii) the second set of pilot tones, iii) one or more data tones in the first set of data tones, and iv) one or more data tones in the second set of data tones.

The first set of OFDM tones further includes a first set of zeroed tones.

The second set of OFDM tones further includes a second set of zeroed tones.

The set of considered overlapping tones includes one or more of i) one or more zeroed tones in the first set of zeroed tones and) one or more zeroed tones in the second set of zeroed tones.

The set of considered overlapping tones includes an even number of tones.

DETAILED DESCRIPTION

Figure 1:
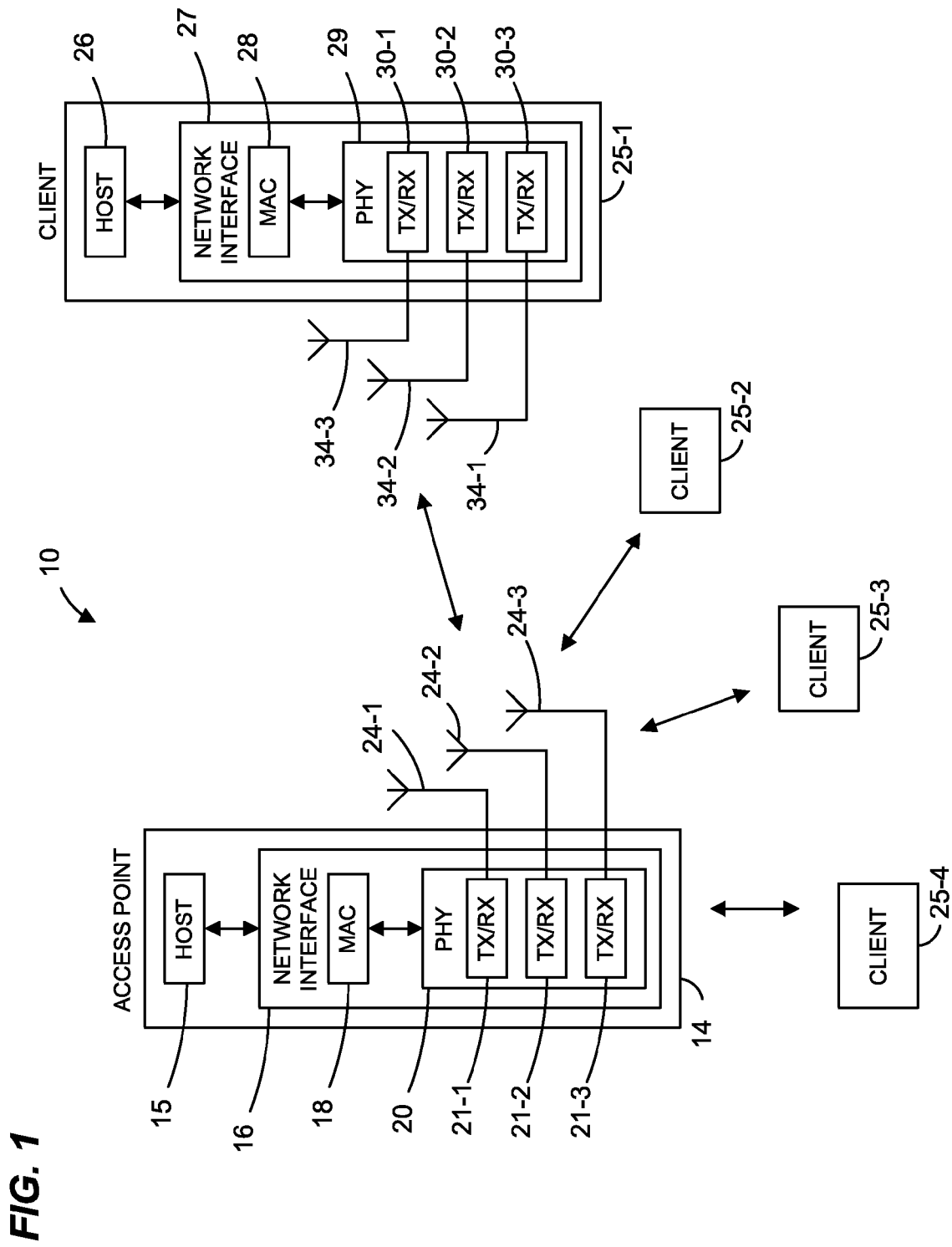
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11 ac) are collectively referred to herein as "short range" communication protocols. In some embodiments, physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub-1 GHz operation. As a result, in this embodiment, a long range data unit maintains the physical layer format of a short range data unit, but is transmitted over a longer period of time.

In addition to this "normal mode" specified by the long range communication protocol, in some embodiments, the long range communication protocol also specifies a "low bandwidth mode" with a reduced bandwidth and data rate compared to the lowest bandwidth and data rate specified for the normal mode. Because of the lower data rate, the low bandwidth mode further extends communication range and generally improves receiver sensitivity. Data units corresponding to the low bandwidth mode are generated utilizing the same clock rate as data units corresponding to the normal mode (e.g., are down-clocked by the same ratio used for normal mode data units). For example, orthogonal frequency division multiplexing (OFDM) symbols of normal mode data units and low bandwidth mode data units both have the same subcarrier/tone spacing and OFDM symbol duration, in an embodiment. In some embodiments, the normal mode and/or low bandwidth mode include multiple PHY sub-modes. In one embodiment, for example, the normal mode includes a first sub-mode corresponding to 2 MHz data units, a second sub-mode corresponding to 4 MHz data units, etc., and the low bandwidth mode corresponds to only 1 MHz data units. In another embodiment, the low bandwidth mode likewise includes multiple sub-modes corresponding to data units having different bandwidths (e.g., 1 MHz, 0.5 MHz, etc.).

The function of the low bandwidth mode may depend on the region in which the mode is utilized. For example, in one embodiment of an IEEE 802.11ah system in the United States, where a relatively large amount of spectrum is available in the sub-1 GHz range, normal mode communications utilize channels having at least a minimum bandwidth (e.g., 2 MHz, or 2.5 MHz, etc.), and the low bandwidth mode serves as a "control mode" having an even smaller bandwidth (e.g., 1 MHz, or 1.25 MHz, etc.). In an embodiment, the AP uses the control mode for signal beacon or association procedures, and/or for transmit beamforming training operations, for example. As another example, in one embodiment of a communication system in which less spectrum is available in the sub-1 GHz range (e.g., Europe or Japan), the low bandwidth mode serves as an extension of the normal mode rather than a control mode.

FIG. 1 is a block diagram of an example WLAN 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna (s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

In some embodiments, the AP 14 is configured to operate in dual band configurations. In such embodiments, the AP 14 is able to switch between a short range mode of operation and a long range mode of operation. According to one such embodiment, when operating in short range mode, the AP 14 transmits and receives data units that conform to one or more of the short range communication protocols. When operating in a long range mode, the AP 14 transmits and receives data units that conform to the long range communication protocol. Similarly, the client station 25-1 is capable of dual frequency band operation, according to some embodiments. In these embodiments, the client station 25-1 is able to switch between a short range mode of operation and a long range mode of operation. In other embodiments, the AP 14 and/or the client station 25-1 is dual band device that is able to switch between different low frequency bands defined for long range operations by the long range communication protocol. In yet another embodiment, the AP 14 and/or the client station 25-1 is a single band device configured to operate in only one long range frequency band.

In still other embodiments, the client station 25-1 is a dual mode device capable of operating in different regions with different corresponding PHY modes. For example, in one such embodiment, the client station 25-1 is configured to utilize the normal mode PHY when operating in a first region, and to utilize the low bandwidth mode PHY when operating in a second region (e.g., a region with less available spectrum). In an embodiment, the client station 25-1 can switch between normal mode and low bandwidth mode in the different regions by switching between low bandwidth mode and normal mode baseband signal processing of the transmitter and receiver, and switching digital and analog filters to meet the requirements applicable to each mode (e.g., spectral mask requirements at the transmitter, adjacent channel interference requirements at the receiver, etc.). Hardware settings such as clock rate, however, are unchanged when switching between low bandwidth mode and normal mode, in an embodiment.

In one example embodiment, client station 25-1 is a dual mode device that utilizes a normal mode PHY in the U.S. (e.g., for 2 MHz and wider channels) and a low bandwidth mode in Europe and/or Japan (e.g., for 1 MHz channels). The same clock rate is used globally, in this embodiment, with different inverse discrete Fourier transform (IDFT) sizes being utilized to generate signals of different bandwidths (e.g., a 64-point or larger IDFT for the 2 MHz or wider bandwidth U.S. channels, and a 32-point IDFT for the 1 MHz Europe/Japan channels). In some of these embodiments, the low bandwidth mode is also used for control PHY in the U.S.

In another example embodiment, client station 25-1 is a dual mode device that in the U.S. utilizes a normal mode PHY (e.g., for 2 MHz and wider channels) and a low bandwidth mode PHY (e.g., for control mode signals having a 1 MHz bandwidth), and in Europe and/or Japan utilizes only the low bandwidth mode PHY (e.g., for 1 MHz channels). The same clock rate is used globally, in this embodiment, with different IDFT sizes being used to generate signals of different bandwidths (e.g., a 64-point or larger IDFT for the 2 MHz or wider bandwidth U.S. channels, and a 32-point IDFT for both the 1 MHz U.S. control mode signals and the 1 MHz Europe/Japan channels).

In some embodiments, devices such as client station 25-1 use the same size IDFT (at a constant clock rate) whether generating a smallest-bandwidth normal mode data unit or a low bandwidth mode data unit. For example, in one embodiment, a 64-point IDFT is used to generate both a 2 MHz normal mode data unit and a 1 MHz low bandwidth mode data unit, with the appropriate tones being zeroed out in the latter case. In some scenarios for these embodiments, filters need not be changed on the fly when changing between PHY modes, while still meeting the spectral mask requirements for the wider (e.g., 2 MHz) channel. In other scenarios, a transmitted low bandwidth mode signal is required to meet a tighter, lower bandwidth spectral mask even if transmitted using an IDFT size corresponding to a wider bandwidth.

Figure 2:
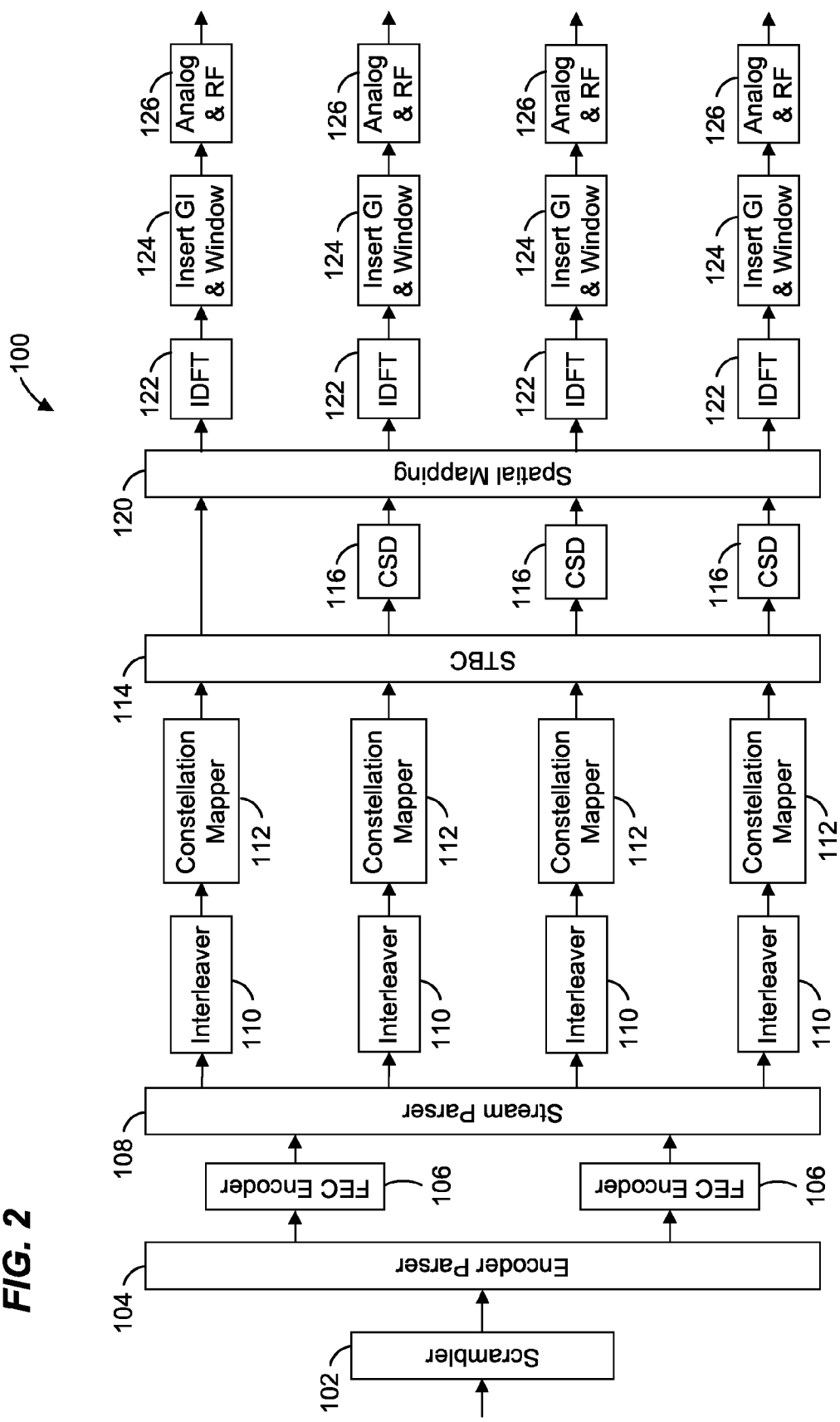
FIG. 2 is a block diagram of a transmit portion of an example physical layer (PHY) processing unit for generating normal mode data units, according to an embodiment.

FIG. 2 is a block diagram of a transmit portion of an example PHY processing unit 100 for generating normal mode data units, according to an embodiment. Referring to FIG. 1, the PHY processing unit 20 of AP 14 and the PHY processing unit 29 of client station 25-1 are each similar to or the same as PHY processing unit 100, in one embodiment. The PHY processing unit 100 includes a scrambler 102 that generally scrambles an information bit stream to reduce occurrences of long sequences of ones or zeros, according to an embodiment. An encoder parser 104 is coupled to the scrambler 102. The encoder parser 208 demultiplexes the information bit stream into one or more encoder input streams corresponding to one or more FEC encoders 106.

While two FEC encoders 106 are shown in FIG. 2, different numbers of FEC encoders are included, and/or different numbers of FEC encoders operate in parallel, in various other embodiments and/or scenarios. For example, according to one embodiment, the PHY processing unit 100 includes four FEC encoders 106, and one, two, three, or four of the FEC encoders 106 operate simultaneously depending on the particular modulation and coding scheme (MCS), bandwidth, and number of spatial streams. Each FEC encoder 106 encodes the corresponding input stream to generate a corresponding encoded stream. In one embodiment, each FEC encoder 106 includes a binary convolutional coder (BCC). In another embodiment, each FEC 106 encoder includes a BCC followed by a puncturing block. In another embodiment, each FEC encoder 106 includes a low density parity check (LDPC) encoder.

A stream parser 108 parses the one or more encoded streams into one or more spatial streams (e.g., four streams in the example PHY processing unit 100 shown in FIG. 2) for separate interleaving and mapping into constellation points/symbols. In one embodiment, the stream parser 108 operates according to the IEEE 802.11n communication protocol, such that the following equation is satisfied:

$$s = \max\left\{1, \frac{N_{BPSCS}}{2}\right\} \quad \text{Equation 1}$$

where s is the number of coded bits assigned to a single axis in a constellation point for each of $N_{SS}$ spatial streams, and where $N_{BPSCS}$ is the number of bits per subcarrier. For each FEC encoder 106 (whether BCC or LDPC), consecutive blocks of s coded bits are assigned to different spatial streams in a round robin fashion, in an embodiment. In some embodiments where the set of FEC encoders 106 includes two or more BCC encoders, the outputs of the individual FEC encoders 106 are used in an alternating fashion for each round-robin cycle, i.e., initially S bits from the first FEC encoder 106 are fed into $N_{SS}$ spatial streams, then S bits from the second FEC encoder 106 are fed into the $N_{SS}$ spatial streams, and so on, where:

$$S = N_{SS} \times s \quad \text{Equation 2}$$

Corresponding to each of the $N_{SS}$ spatial streams, an interleaver 110 interleaves bits of the spatial stream (i.e., changes the order of the bits) to prevent long sequences of adjacent noisy bits from entering a decoder at the receiver. More specifically, the interleaver 110 maps adjacent coded bits onto non-adjacent locations in the frequency domain or in the time domain. The interleaver 110 operates according to the IEEE 802.11n communication protocol (i.e., two frequency permutations in each data stream, and a third permutation to cyclically shift bits differently on different streams), in an embodiment, with the exception that the parameters $N_{col}$, $N_{row}$, and $N_{rot}$ (i.e., number of columns, number of rows, and frequency rotation parameter, respectively) are suitable values based on the bandwidth of the long range, normal mode data units.

Also corresponding to each spatial stream, a constellation mapper 112 maps an interleaved sequence of bits to constellation points corresponding to different subcarriers/tones of an OFDM symbol. More specifically, for each spatial stream, the constellation mapper 112 translates every bit sequence of length log$_2$(M) into one of M constellation points, in an embodiment. The constellation mapper 112 handles different numbers of constellation points depending on the MCS being utilized. In an embodiment, the constellation mapper 112 is a quadrature amplitude modulation (QAM) mapper that handles M=2, 4, 16, 64, 256, and 1024. In other embodiments, the constellation mapper 112 handles different modulation schemes corresponding to M equaling different subsets of at least two values from the set {2, 4, 16, 64, 256, 1024}.

In an embodiment, a space-time block coding (STBC) unit 114 receives the constellation points corresponding to the one or more spatial streams and spreads the spatial streams to a number (N$_{STS}$) of space-time streams. In some embodiments, the STBC unit 114 is omitted. Cyclic shift diversity (CSD) units 116 are coupled to the STBC unit 114. The CSD units 116 insert cyclic shifts into all but one of the space-time streams (if more than one space-time stream) to prevent unintentional beamforming. For ease of explanation, the inputs to the CSD units 116 are referred to as space-time streams even in embodiments in which the STBC unit 114 is omitted.

A spatial mapping unit 120 maps the N$_{STS}$ space-time streams to N$_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 120 corresponds to a transmit chain, and each output of the spatial mapping unit 120 is operated on by an IDFT calculation unit 122 (e.g., an inverse fast Fourier transform (IFFT) calculation unit) that converts a block of constellation points to a time-domain signal. Outputs of the IDFT units 122 are provided to GI insertion and windowing units 124 that prepend to OFDM symbols, a guard interval (GI) portion, which is a circular extension of an OFDM symbol in an embodiment, and smooth the edges of OFDM symbols to increase spectral delay. Outputs of the GI insertion and windowing units 124 are provided to analog and radio frequency (RF) units 126 that convert the signals to analog signals and upconvert the signals to RF frequencies for transmission. The signals are transmitted in a 2 MHz, a 4 MHz, an 8 MHz, or a 16 MHz bandwidth channel (e.g., corresponding to a 64-, 128-, 256-, or 512-point IDFT at unit 122, respectively, and utilizing a clock rate that is constant regardless of IDFT size), in various embodiments and/or scenarios. In other embodiments, other suitable channel bandwidths (and/or IDFT sizes) are utilized. Long range data units corresponding to the normal mode are discussed in more detail in U.S. patent application Ser. No. 13/359,336, filed on Jan. 6, 2012 and entitled "Physical Layer Frame Format for Long Range WLAN," which is hereby incorporated by reference herein in its entirety.

Low bandwidth mode communications are generally more robust than normal mode communications, having a sensitivity gain that supports extended range communications. For example, in an embodiment in which the normal mode utilizes a 64-point IDFT (e.g., for a 2 MHz bandwidth signal) to generate normal mode data units, and in which the low bandwidth mode utilizes a 32-point IDFT (e.g., for a 1 MHz bandwidth signal) to generate low bandwidth mode data units, the low bandwidth mode provides approximately a 3 dB sensitivity gain. As another example, in an embodiment in which the normal mode utilizes a 64-point IDFT (e.g., for a 2 MHz bandwidth signal) to generate normal mode data units, and in which the low bandwidth mode utilizes a 16-point IDFT (e.g., for a 0.5 MHz bandwidth signal) to generate low bandwidth mode data units, the low bandwidth mode provides approximately a 6 dB sensitivity gain. Moreover, in some embodiments, the low bandwidth mode introduces redundancy or repetition of bits into at least some fields of the data unit to further reduce the data rate. For example, in various embodiments and/or scenarios, the low bandwidth mode introduces redundancy into the data portion and/or the signal field of a low bandwidth mode data unit according to one or more repetition and coding schemes described below. In an embodiment where the low bandwidth mode includes a 2× repetition of bits, for example, a further 3 dB sensitivity gain may be obtained. Still further, in some embodiments, the low bandwidth mode improves sensitivity by generating OFDM symbols in accordance with the lowest data rate MCS of the normal mode, or in accordance with an MCS lower than the lowest data rate MCS of the normal mode. As an example, in an embodiment, data units in normal mode are generated according to a particular MCS selected from a set of MCSs, such as MCS0 (binary phase shift keying (BPSK) modulation and coding rate of ½) to MCS9 (quadrature amplitude modulation (QAM) and coding rate of ⅚), with higher order MCSs corresponding to higher data rates. In one such embodiment, the low bandwidth mode data units are generated using modulation and coding as defined by MCS0. In an alternative embodiment, MCS0 is reserved for low bandwidth mode data units only, and cannot be used for normal mode data units.

In some embodiments, PHY processing units employed by the AP 14 and/or by the client stations 25 to generate low bandwidth data units correspond to the same hardware as the PHY processing unit 100 of FIG. 2, but with different signal processing operations being utilized within the hardware depending on whether normal mode or low bandwidth mode data units are being generated. In some such embodiments, various parameters of certain components of the PHY processing unit 100 are changed when a low bandwidth data unit is generated. For example, relevant parameters for Equations 1 and 2 above (e.g., N$_{BPSCS}$ and N$_{SS}$) are changed to match the low bandwidth mode system parameters (e.g., N$_{SS}$=1 if only one spatial stream is permitted for low bandwidth mode data units), in an embodiment. Further, in some embodiments, the parameters N$_{col}$, N$_{row}$, and N$_{rot}$ of the interleavers 110 are changed, when a low bandwidth data unit is generated, to suitable values based on the bandwidth of the low bandwidth data units. In some embodiments, a PHY processing unit generates low bandwidth mode data units utilizing repetition of BCC-encoded bits, prior to mapping the bits to constellation symbols. Various specific examples of PHY processing units utilized for generating low bandwidth data units in some embodiments are described in U.S. patent application Ser. No. 13/494,505, entitled "Low Bandwidth PHY for WLAN," which is hereby incorporated herein in its entirety.

Figure 3A:
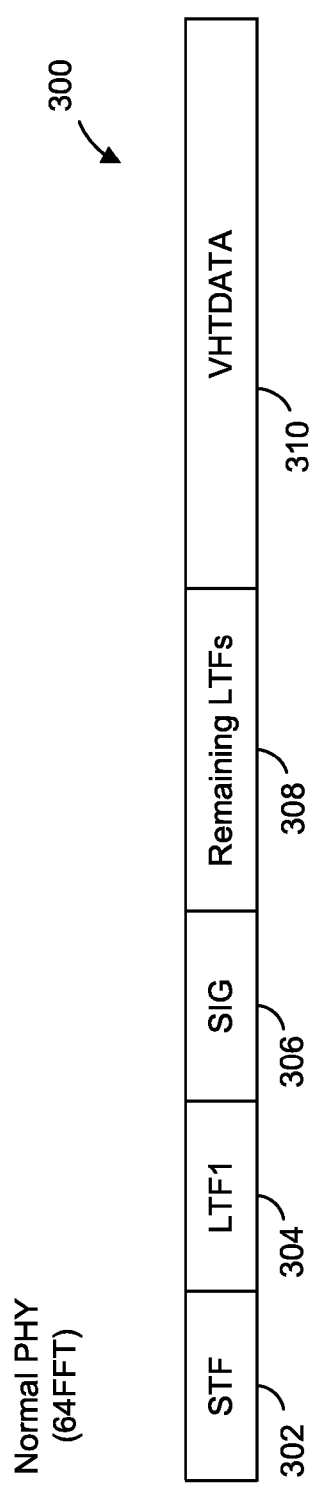
FIGS. 3A and 3B are diagrams of an example normal mode data unit and an example low bandwidth data unit, according to an embodiment.

FIG. 3A is a diagram of an example normal mode data unit 300 that the AP 14 is configured to transmit to the client station 25-4 via orthogonal frequency domain multiplexing (OFDM) modulation, according to an embodiment. In an embodiment, the client station 25-4 is also configured to transmit the data unit 300 to the AP 14, according to an embodiment. The normal mode data unit 300 is a down-clocked version of data units conforming to a short range protocol. For the particular embodiment shown in FIG. 3, the normal mode data units 300 is a down-clocked version of an IEEE 802.11n data unit using the "Greenfield" (rather than mixed mode) preamble. In other embodiments, the normal mode data unit 300 is a down-clocked version of a data unit conforming to another short range protocol. Different examples of normal mode data units according to various embodiments are described in U.S. patent application Ser. No. 13/359,336.

The normal mode data unit 300 corresponds to a lowest normal mode channel bandwidth (e.g., 2 MHz utilizing a 64-point IDFT), and includes a short training field (STF) 302, a first long training field (LTF1) 304, a signal (SIG) field 306, remaining LTFs 308 (e.g., one additional LTF per spatial stream), and a very high throughput data (VHTDATA) portion 310. Generally, the STF 302 is used for packet detection, initial synchronization, and automatic gain control, etc., the LTFs 304 are used for channel estimation and fine synchronization, and the SIG field 306 is used to carry certain physical layer (PHY) parameters of the data unit 300, such as signal bandwidth (e.g., 2 MHz for data unit 300), modulation type, and coding rate used to transmit the data unit, for example.

For higher bandwidth normal mode data units, the STF, LTFs, and SIG field are duplicated in each of multiple sub-bands, each sub-band having a bandwidth equal to the lowest normal mode channel bandwidth, in some embodiments. For example, in an embodiment, a higher bandwidth (e.g., 4 MHz, 8 MHz, 16 MHz, etc.) data unit duplicates the STF 302, LTFs 304, 308, and the SIG field 306 in each 2 MHz band as a preamble to the data portion 310 of the data unit, and the data portion 310 occupies the full (e.g., 4 MHz, 8 MHz, 16 MHz, etc.) bandwidth without frequency duplication. A receiver detecting normal mode data unit 300 is able to determine the bandwidth of the data unit based on bandwidth information in SIG field 306, in an embodiment.

Figure 3B:
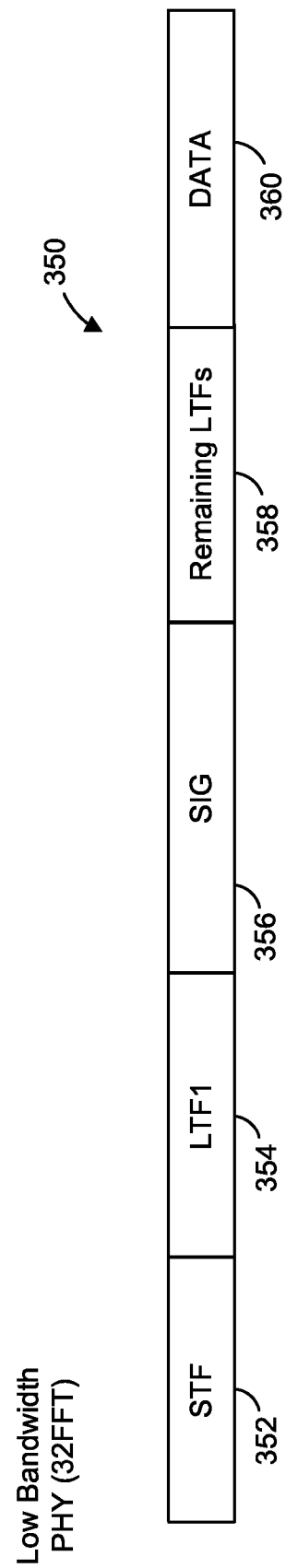

FIG. 3B is a diagram of a preamble of an example low bandwidth mode data unit 350, according to an embodiment. The low bandwidth mode data unit 350 is generated using the same clock rate as the normal mode data unit 300, but utilizing a smaller size IDFT to reduce the bandwidth. For example, in one embodiment in which the normal mode data units 300 corresponds to a 2 MHz or a 4 MHz bandwidth generated using 64- and 128-point IDFTs, respectively, the low bandwidth mode data unit 350 has a 1 MHz bandwidth, and is generated using a 32-point IDFT. Similar to the normal mode data unit 300, the low bandwidth mode data unit 350 includes an STF 352, an LTF1 354, a SIG field 356, and remaining LTFs 358 (e.g., one additional LTF per spatial stream, if more than one spatial stream is utilized for low bandwidth mode data units). The STF 352, LTFs 354, 358 and SIG 356 make up the preamble portion of the data unit 350. In some embodiments, various fields within the preamble of low bandwidth mode data unit 350 differ in various ways from the corresponding fields in the normal mode data unit 300. Generally, any of the low rate PHY preambles described in U.S. application Ser. No. 13/366,064 are utilized for low bandwidth mode data units, in various embodiments, but with a reduced bandwidth as compared to normal mode data units. In some embodiments, the low bandwidth mode data unit 350 also includes the data portion 360 having the same bandwidth as the preamble of the data unit 350.

In some embodiments, various fields within the preamble of low bandwidth mode data unit 350 differ in various ways from the corresponding fields in the normal mode data units 300. For example, in some embodiments, various fields of the low bandwidth data unit 350 are longer and, accordingly, occupy more OFDM symbols compared to the corresponding fields of the normal mode data unit 300. For example, in an embodiment, the STF training field 352 of the low bandwidth data unit 350 includes a greater number of short training sequences (STS) compared to the number of short training sequences included in the STF training field 302 of the normal mode data unit 300. In an embodiment, the extra STF sequences are added in low bandwidth data units to improve the ability of a receiving device to detect the low bandwidth data unit under lower signal to noise ratio (SNR) generally associated with longer range transmission of the low bandwidth data units. As a specific example, in one embodiment, the STF field 302 of the normal mode data unit 300 occupies two OFDM symbols, and the STF field 402 of the low bandwidth data unit 350 occupies four OFDM symbols. Further, in some embodiments, the power level of the STF 352 is boosted relative to the rest of the data unit 350 by a suitable amount (e.g., by 3 dB). The power boost further facilitates detection of the data unit 350 at the receiver. In one embodiment, the power boost (e.g., 3 dB power boost) is only applied by a transmitting device for STFs of low bandwidth mode data units that are modulated at the lowest data rate, such as MCS0 rep 2, which corresponds to BPSK modulation, single stream, and with a bit repetition block, according to an embodiment, and is not applied for STFs of normal mode data units and/or for STFs of low bandwidth mode data units that are not modulated using bit repetition.

In an embodiment, the SIG field 356 of the data unit 350 is longer and includes a greater number of OFDM symbols compared to the SIG field 306 of the normal mode data unit 300. In one embodiment, the SIG field 306 occupies two OFDM symbols, and the SIG field 356 occupies a higher number (e.g., 4, 5, 6, etc.) of OFDM symbols. In one embodiment, the SIG field 356 is modulated using bit or block repetition (e.g. Rep 2), while the SIG field 306 of the normal mode data unit 300 does not include repetition. In an embodiment, the SIG field 356 is generated using the lowest order MCS with x2 repetition (MCS0 rep 2) regardless of the modulation and coding of the data portion 360.

Figure 4A:
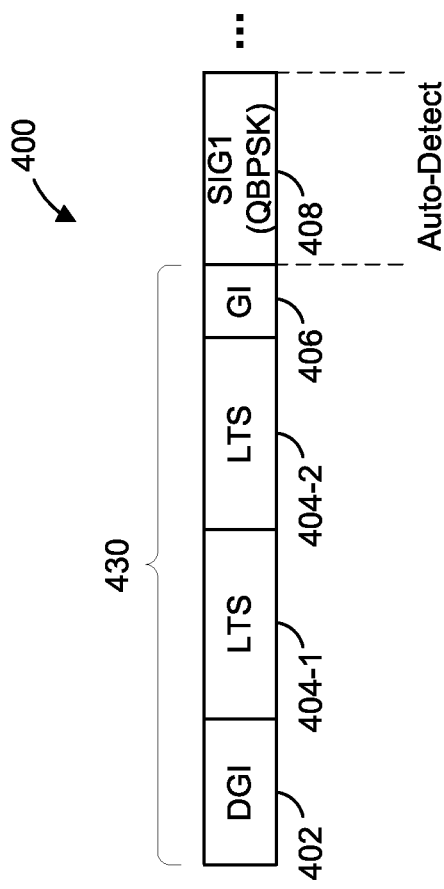
FIGS. 4A and 4B are diagrams illustrating a preamble portion of a normal mode data unit and a preamble portion of a low bandwidth mode data unit, respectively, according to an embodiment.
Figure 4B:
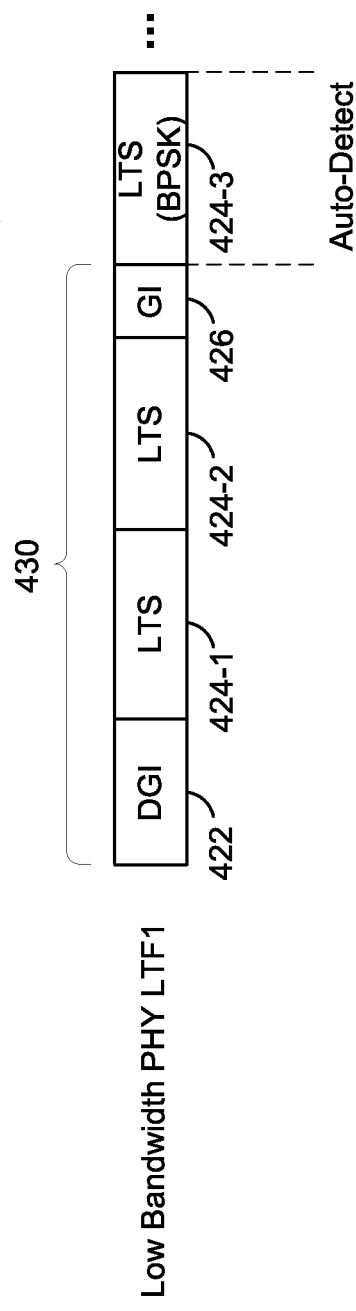

According to an embodiment, the LTF1 field 354 of the low bandwidth data unit 350 is longer compared to the LTF1 field 304 of the normal mode data units 300. For example, in one embodiment, the LTF1 field 354 includes a greater number of repetitions of a low training sequence (LTS) compared to the number of LTS repetitions included in the LTF1 field 304. FIGS. 4A and 4B are diagrams illustrating a preamble portion 400 and a preamble portion 420 included in a normal mode data unit and a low bandwidth mode data unit, respectively, according to an embodiment. In an embodiment, the preamble portion 400 corresponds to the LTF1 field 304 and the first OFDM symbol of the SIG field 306 in FIG. 3A, and the preamble portion 420 corresponds to the first three OFDM symbols of the LTF1 field 354 in FIG. 3B. The preamble portion 400 includes a double guard interval (DGI) 402, two long training symbols (LTS) 404 in a first long training field (LTF1), a guard interval (GI) 406, and a first OFDM symbol of a signal field (SIG1) 408. The first OFDM symbol field 408 begins a time interval 430 after the beginning of LTF1 (i.e., the beginning of DGI 402 within LTF1). The preamble portion 420 similarly includes DGI 422, two LTS 424 in LTF1, and a guard interval (GI) 426. The LTF1 of the preamble portion 420, however, includes a greater number of long training symbols than the preamble portion 400 of the normal mode data unit. For example, LTF1 of the second preamble portion 420 includes four long training symbols, in an embodiment. In one embodiment, each long training symbol after LTS 424-2 is preceded by a guard interval. For example, as seen in the example embodiment of FIG. 4B, the guard interval 426 separates the third and fourth LTSs 424-2 and 424-3, respectively. By including guard interval 426, the location of the third LTS 424-3 relative to the beginning of LTF1 of preamble portion 420 is the same as the location of the SIG1 field 408 relative to the beginning of LTF1 of preamble portion 400 (i.e., each begins a time interval 430 after the beginning of the corresponding LTF1). Moreover, the SIG1 408 is modulated with a different modulation technique than the third LTS 454-3, in an embodiment. For example, the SIG1 field 408 is quaternary binary phase shift key (QBPSK) modulated and the third LTS 424-3 is binary phase shift key (BPSK) modulated, or vice versa, in various embodiments.

Figure 5:
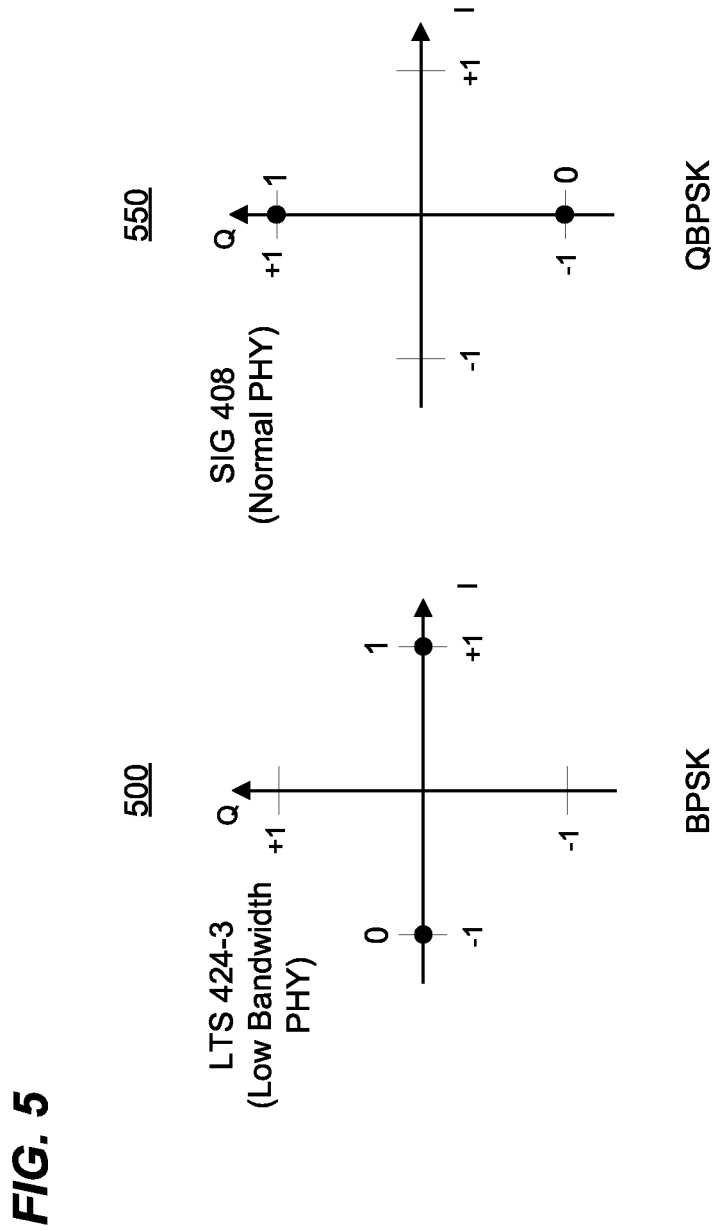
FIG. 5 is a diagram illustrating example modulation techniques used to modulate symbols within fields of a preamble, according to an embodiment.

In some embodiment, a receiving device utilizes the modulation of the OFDM symbol at a symbol location corresponding to a certain time period, for example a time period after a determined timing reference in an incoming data unit to determine or auto-detect the PHY mode of the incoming data unit. For example, the receiver determines the timing reference to be the boundary between the STF field and the LTF field of a data unit. Thus, a receiving device that synchronizes with a received data unit prior to the SIG1 field 708 or third LTS 724-3 can detect the modulation technique being used at the location of SIG1 (if a normal mode data unit) or the third LTS (if a low bandwidth mode data unit), and determine the PHY mode accordingly. FIG. 5 illustrates the BPSK modulation constellation 500 and the QBPSK modulation constellation 550. As seen in FIG. 5, the set of two constellation symbols for QBPSK is rotated by 90 degrees with respect to the set of two constellation symbols for BPSK.

Additionally or alternatively, in an embodiment, a receiving device determines the PHY mode of an incoming data unit based on the LTF sequence included in a long training field (e.g., in LTF1 304 of FIG. 3A, LTF1 354 of FIG. 3B) of the incoming data unit. To this end, in an embodiment, a long training sequence used in low bandwidth mode data units is designed to be different, e.g. orthogonal to or of a suitably low correlation with the long training sequence used in normal mode bandwidth data units. More specifically, in an embodiment, long training sequence values that modulate at least a portion of OFDM tones in a low bandwidth data unit that overlap with corresponding OFDM tones in a normal bandwidth data unit ("overlapping tones") are designed such that cross-correlation of these tones in a low bandwidth data unit with the corresponding tones in a normal bandwidth data unit results in a correlation value of zero or of another suitably low correlation value (e.g., 1).

Figure 6A:
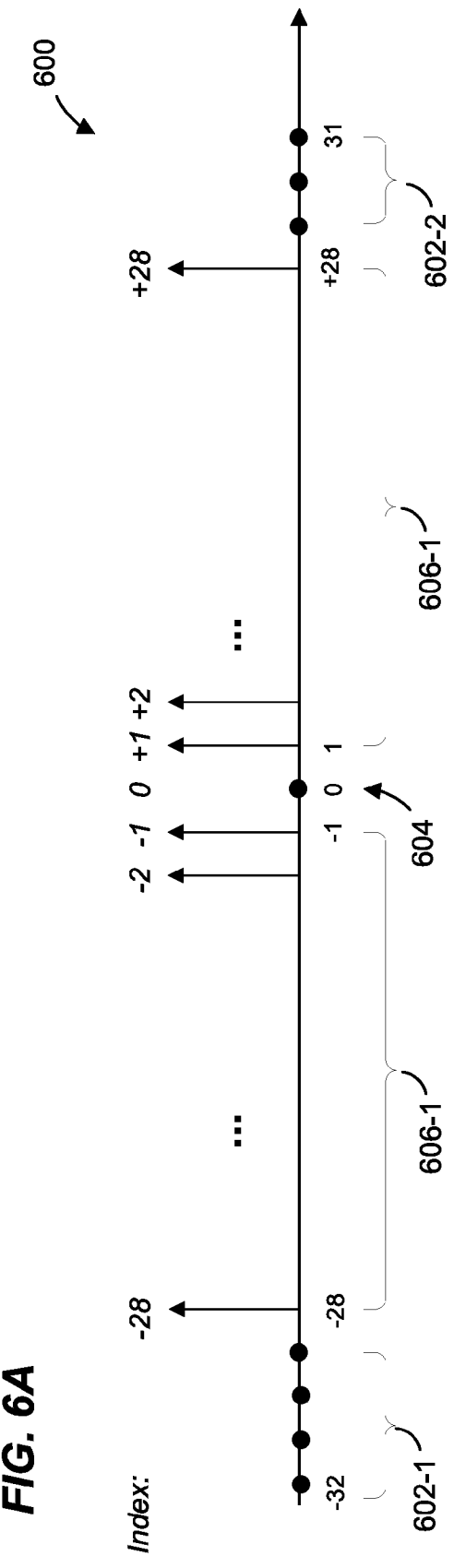
FIGS. 6A and 6B are diagrams of example orthogonal frequency division multiplexing (OFDM) tone maps corresponding to a normal mode data unit and a low bandwidth mode data unit, respectively, according to an embodiment.
Figure 6B:
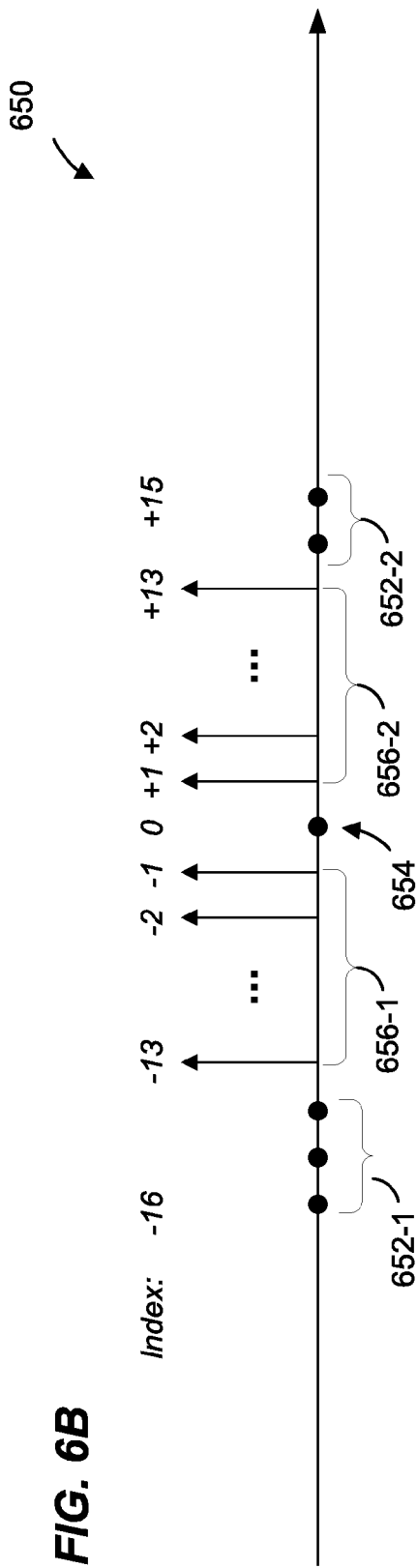

FIGS. 6A and 6B are diagrams of example tone maps 600, 650 corresponding to normal mode and low bandwidth mode data units, according to an embodiment. In an embodiment, the tone map 600 corresponds to OFDM tones in the normal mode data unit 300 of FIG. 3A, and the tone map 650 corresponds to OFDM tones in the low bandwidth data unit 350 of FIG. 3B. Referring first to FIG. 6A the tone map 600 corresponds to a 2 MHz normal mode data unit generated using a 64-point IDFT. The tone map 600 includes 64 OFDM tones indexed -32 to 31. Of the 64 OFDM tones, two sets of (zeroed) tones 602 correspond to guard tones, and a center (zeroed) tone 604 serves as the DC tone. The remaining two sets of tones 606 include 56 tones indexed -28 to -1 and 1 to 28 that correspond to data and pilot tones. In an embodiment, the OFDM map 600 includes four pilot tones located at tone indices [+/-7 and +/-31]. In other embodiments, the tone map 600 includes another suitable number of pilot tones and/or includes pilot tones at other suitable tone locations.

Referring now to FIG. 6B the tone map 650 corresponds to a 1 MHz low bandwidth mode data unit generated using a 32-point IDFT. The tone map 650 includes 32 OFDM tones indexed -16 to 15. Of the 32 OFDM tones, two sets of (zeroed) tones 652 correspond to guard tones, and a center (zeroed) tone 654 serves as the DC tone. The remaining two sets of tones 656 indexed -13 to -1 and 1 to 13 correspond to data and pilot tones. In an embodiment, the symbol map 650 includes two pilot tones located at tone indices [+/-7]. In other embodiments, the tone map 650 includes another suitable number of pilot tones and/or includes pilot tones at other suitable tone locations.

In an embodiment, a low bandwidth data unit is transmitted in a sub-band of a communication channel defined based on a normal mode data unit. As an example, a 1 MHz low bandwidth data unit is transmitted on a lower sideband (LSB) or an upper sideband (USB) of a communication channel defined for 2 MHz normal mode transmission. In this embodiment, the tone map 650 is shifted to the lower sideband or the upper sideband of the normal mode channel. Accordingly, in this embodiment, each tone in the tone map 650 is mapped to a corresponding position in a lower sideband of the normal mode channel by subtracting or adding 16 from the tone index indicated in FIG. 6B. Thus, data and pilot tones 656 in the tone map 650 are mapped to tone indices [-29:-3], with the zeroed DC tone mapped to the tone index -16, in an embodiment. Similarly, in an embodiment in which a low bandwidth data unit is transmitted in the upper sideband of the normal mode communication channel, data and pilot tones 656 in the tone map 650 are mapped to tone indices spanning [3:28], with the zeroed DC tone mapped to the tone index 16.

In some embodiments, pilot tones in the LTF1 field of a multi-stream data unit are single-stream pilot tones. Single stream pilot tones allow a receiver to perform phase tracking prior to having received all long training fields, in some embodiments.

With reference to FIGS. 3A & 3B, in an embodiment, the OFDM data and pilot tones of the LTF fields 304, 308 of the normal mode data unit 300 and/or the LTF field of the low bandwidth data unit 354, 358 are mapped to multiple spatial streams according to Equation 3:

$$[HTLTF1_k, HTLTF2_K, \ldots ,$$
$$HTLTFN_k] = Q_k D_{CSD}^{(k)} A_{HTLTF}^k LTF_k$$
$$A_{HTLTF}^k = \begin{cases} R_{HTLTF}, & \text{if } k \in K_{Pilot} \\ P_{HTLTF}, & \text{otherwise} \end{cases}$$

Equation 3 where the subscript k denotes a tone index, Q is a spatial mapping matrix, $D_{CSD}$ is a diagonal matrix with diagonal elements representing cyclic shifts in the time domain, $A_{HTLTF}$ is a mapping matrix for the long training field, and $LTF_k$ is the long training field value for the $k^{th}$ tone. With continued reference to Equation 3, $K_{pilot}$ represents a set tone indices corresponding to pilot tones, and $P_{HTLHF}$ is a mapping matrix used for mapping long training field data tones to multiple spatial streams. As an example, according to an embodiment, $P_{HTLHF}$ for mapping LTF data tones to spatial streams is defined as:

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Equation 4

In an embodiment, a subset of the mapping matrix in Equation 4 is used for mapping LTF data tones if the data unit is to be transmitted using less than four spatial streams (e.g., a 2×2 subset matrix for two spatial streams with two LTFs, a 3×4 subset matrix for three spatial streams with four LTFs, etc.). Further, the $R_{HTLFT}$ matrix is a mapping matrix for LTF pilot tones, which is defined differently in different embodiments. In one embodiment, the $R_{HTLFT}$ matrix is as given by:

$$[R_{HTLTF}]_{m,n} = [P_{HTLTF}]_{m,1}, 1 \le m, n \le N_{HTLTF} \qquad \text{Equation 5}$$

Accordingly, in this embodiment, all pilot tones in the L LTF fields 304, 308 of the normal mode data unit 300 and/or the LTF field of the low bandwidth data unit 354, 358 are mapped to multiple spatial streams using the first column of the spatial stream mapping matrix P. Further, in this embodiment, the pilot tones in the data portion 310 of the normal mode data unit 300 and/or the data portion 360 of the low bandwidth data unit 350 are mapped as shown in Equation 6:

$$x_{k_{pilot}}(n) = Q_{k_{pilot}} D_{CSD}^{(k_{pilot})} [P_{HTLTF}]_{*,1} p_{k_{pilot}}(n) \qquad \text{Equation 6}$$

where n is a symbol index. That is, in this case, the pilot tones in the data portion are also mapped to multiple spatial streams using the first column of the tone mapping matrix P.

In another embodiment, the $R_{HTLFT}$ matrix is as defined in the IEEE 802.11ac Standard, given by:

$$[R_{HTLTF}]_{m,n} = [P_{HTLTF}]_{1,n}, 1 \le m, n \le N_{HTLTF} \qquad \text{Equation 7}$$

Accordingly, in this embodiment, all pilot tones in the L LTF fields 304, 308 of the normal mode data unit 300 and/or the LTF field of the low bandwidth data unit 354, 358 are mapped to multiple spatial streams using the first row of the spatial stream mapping matrix P. Further, in this embodiment, the pilot tones in the data portion 1016 of the data unit 1000 are mapped as shown in Equation 6:

$$x_{k_{pilot}}(n) = Q_{k_{pilot}} D_{CSD}^{(k_{pilot})} \begin{bmatrix} 1 \\ 1 \\ \vdots \\ 1 \end{bmatrix} p_{k_{pilot}}(n) \qquad \text{Equation 6}$$

where n is a symbol index. That is, in this case, the pilot tones in the data portion are also mapped to multiple spatial streams using the first row of the tone mapping matrix P.

In an embodiment, a receiving device determines the PHY mode of a data unit in response detecting an LTF sequence according to which the LTF1 field of the data unit is modulated when a certain number of tones in the LTF1 field in an overlapping band of transmission of normal mode data units and low bandwidth data units are considered. For example, referring to FIG. 6B, when a low bandwidth data unit generated according to the tone map 650 is transmitted in a lower sideband of a 2 MHz communication channel, the data and pilot tones 656 of the tone plan 650 are mapped to tone indices −29 to −3. Referring now to FIG. 6A, the data and pilot tones 606 of a 2 MHz data unit in the lower sideband of the 2 MHz communication channel correspond to tone indices −28 to 1. In this case, a set of overlapping data and pilot tones in the 2 MHz normal mode data unit and the 1 MHz low band data unit includes 25 tones indexed [−27:−15, −15 to −3]. Similarly, when a low bandwidth data unit is transmitted in the upper sideband of a 2 MHz communication channel, the data and pilot tones 656 of the tone plan 650 are mapped to tone indices [3:29], in an embodiment. As seen in FIG. 6A, the data and pilot tones 606 of a 2 MHz data unit in the upper sideband of the 2 MHz communication channel correspond to tone indices [1:28]. In this case, a set of overlapping data and pilot tones in the 2 MHz normal mode data unit and the 1 MHz low bandwidth data unit includes 25 tones indexed [3 :15, 17 to 28]. In other embodiments, depending on the particular tones plans utilized for normal mode and for low bandwidth mode data units, sets of overlapping tones include other numbers of total overlapping tones and/or overlapping tones at other tone index locations.

Because a low bandwidth data unit is typically transmitted in a sub-band of channel that corresponds to a wider bandwidth data unit, where the particular sub-band used for transmission of low bandwidth data units is known a receiver a priori (e.g., as established by MAC level exchanges between a transmitter and the receiver), the receiver is able to auto-detect the PHY mode of an incoming data unit by considering some or all of OFDM tones in the set of overlapping tones in a low bandwidth data unit and a normal bandwidth data unit, and determining which of two possible LTF sequences corresponds to the considered tones in the incoming data unit. More specifically, in one embodiment, the receiving device determines the LTF sequence corresponding to an incoming data unit by performing cross-correlation of the considered OFDM tones of the incoming data unit with each one of the two possible LTF sequences, using the considered tones in the set of overlapping tones.

To allow a receiving device to accurately determine the PHY mode of a data unit based on the LTF1 field of the data unit, LTF sequence values are designed such that LTF sequence values corresponding to at least some of OFDM tones overlapping with OFDM tones in normal mode data units result in a zero or a low cross-correlation between an LTF sequence used to modulate the LTF1 field of a normal bandwidth data unit (e.g., the LTF 1 field 304 of FIG. 3A) and an LTF sequence used to modulate the LTF1 field of a low bandwidth data unit (e.g., the LTF 1 field 304 of FIG. 3A). In an embodiment, LTF sequence values for normal mode data units are designed such that the sequence values in a normal mode data unit having a higher bandwidth are the same as the values used for overlapping tones in higher bandwidth data units. For example, the LTF values used to modulate corresponding overlapping tones in 2 MHz data unit and a 4 MHz data unit are the same, in this embodiment. As an example, in an embodiment, LTF pilot signs in a 2 MHz normal mode data unit are given by:

$$[LTF_{2MHz}]_{-28:28} = [1, 1, LTF_{left}, 0, LTF_{right}, -1, -1] \qquad \text{Equation 7}$$

where $LTF_{left}$ corresponds to pilot signs of OFDM tones indexed −26 to −1, and $LTF_{right}$ corresponds to pilot signs of OFDM tones indexed 1 to 26. In an embodiment, the OFDM tones of wider bandwidth data units that overlap with the OFDM tones $LTF_{left}$ and $LTF_{right}$ in the 2 MHz normal mode data unit are modulated with LTF pilot signs that correspond to the LTF pilot signs used in $LTF_{left}$ and $LTF_{right}$ in the 2 MHz normal mode data unit. For example, in an embodiment, LTF pilot signs in a 4 MHz normal mode data unit are given by:

$$[LTF_{4MHz}]_{-58:58} = [LTF_{left}, 1, LTF_{right}, -1, -1, -1, 1, 0, 0, 0, -1, 1, 1, -1, LTF_{left}, 1, LTF_{right}] \qquad \text{Equation 8}$$

In an embodiment, the particular LTF sequence values corresponding to the OFDM tones in the lower portion of an OFDM symbol of a normal mode data unit (e.g., the tones −32 to 0 in FIG. 6A) are not the same as the LTF sequence value of the corresponding tones in the upper portion of the OFDM symbol (e.g., the tones 0 to 32 in FIG. 6A). For example, in an embodiment, normal mode data units utilize the LTF sequence specified for a corresponding data unit bandwidth in the short range communication protocol with respect to which the normal mode data unit is down-clocked (e.g., as specified in the IEEE 802.11n Standard or the IEEE 802.11ac Standard), in which LTF sequence values that correspond to OFDM tones in the lower sideband of a communication channel are not generally designed to be the same as the LTF sequence values that modulate the corresponding OFDM tones in the upper sideband of the channel. Nonetheless, in an embodiment, a same LTF sequence is utilized for a low bandwidth data unit, regardless of whether the upper sideband or the lower sideband of a normal mode channel is used for transmitting the low bandwidth data unit (i.e., regardless of the placement of the low bandwidth channel within the higher bandwidth normal mode channel). In this embodiment, the low bandwidth LTF sequence is designed such that the sequence is orthogonal to or has a low correlation with the considered OFDM tones corresponding to both the lower and the upper sidebands of the wider bandwidth LTF sequence. In another embodiment, to facilitate the design of a single low bandwidth LTF sequence that is orthogonal to or of low correlation with both the upper and the lower sidebands in a normal mode communication channel, an LTF sequence for normal mode data units is designed such that the LTS values that modulate corresponding OFDM tones in the upper and the lower sidebands are the same.

In mathematical terms, cross-correlation between the low bandwidth mode LTF sequence and the normal mode LTF sequence, according to an embodiment, is given by:

$$\begin{cases} S_{lowBW\_K_{OVLP\_lowBW}} \cdot S_{normal\_LSB\_K_{OVLP}} = \varepsilon_{LSB} \\ S_{lowBW\_K_{OVLP\_lowBW}} \cdot S_{normal\_LSB\_K_{OVLP}} = \varepsilon_{USB} \end{cases} \quad \text{Equation 9}$$

where $S_{normal\_LSB\_K_{OVLP}}$ is a row vector of LTF values corresponding to the considered OFDM tones when a low bandwidth data unit is transmitted in the lower sideband of the normal mode channel, $S_{normal\_USB\_K_{OVLP}}$ is a row vector of LTF values corresponding to the considered OFDM tones when a low bandwidth data unit is transmitted in the upper sideband of the normal mode channel. In general, as used herein, $K_{OVLP\_lowBW}$ refers to the tone indices corresponding to the considered OFDM tones in a low bandwidth mode data unit, $K_{OVLP\_LSB}$ refers to the tone indices corresponding to the considered OFDM tones in a lower sideband of a normal mode data unit, and $K_{OVLP\_LSB}$ refers to the tone indices corresponding to the considered OFDM tones in an upper sideband of a normal mode data unit.

The particular OFDM tones that are considered by a receiver for auto-detection of the PHY mode of a data unit is different in different embodiments. For example, in one embodiment, the set of considered OFDM tones includes all of the overlapping OFDM tones. In another embodiment, tone indices corresponding to the pilot tones in the normal mode and/or the low bandwidth data units are excluded from the set of considered OFDM tones. In addition to or instead of excluding the pilot tones, in some embodiments, some of the overlapping data tones in the normal mode and/or the low bandwidth tone maps are excluded from the set of considered OFDM tones. In some embodiments, some OFDM tones are excluded from consideration such that the set of considered overlapping tones includes an even number of tones. For example, referring to the tone maps of FIGS. 6A and 6B, only 24 of the overlapping 25 tones is considered, according an embodiment. As an example, tone indices −28 and 28 in a normal mode data unit are excluded from consideration. Thus, in this embodiment, a total of 24 overlapping tones are considered. In another embodiment, two pilot tones in a low bandwidth OFDM symbol tone plan are excluded in addition to excluding the data tones corresponding to tone indices −28 and +28. Accordingly, in this embodiment, 22 overlapping tones are considered. As yet another example, in another embodiment, two pilot tones in each sub-band of the normal 2 MHz OFDM symbol are excluded in addition to excluding the pilot tones in the low bandwidth mode tone plan as well as the data tones at the +/−28 tone indices, in which case 20 overlapping tones in considered. Alternatively, in another embodiment, the set of considered overlapping tones includes one or more additional tones besides of the overlapping data and pilot tones. For example, in one embodiment, the set of considered overlapping tones in a data unit includes one or more of the zeroed tones, e.g. guard tones, in the corresponding tone plan. For example, in one such embodiment, the zeroed tones in the 2 MHz tone map 600 (FIG. 6A) at tone indices +/−29.

Inclusion or exclusion of pilot tones from the set of considered overlapping tones depends on whether single stream pilot tones or multi-stream pilot tones are being utilized, in some embodiments. In general, cross correlation between normal mode and low bandwidth mode LTF sequences is highly dependent on tone continuity between adjacent tones considered when cross-correlation is performed. As a result, in some embodiments, if single-stream pilot tones are utilized, and a pilot tone is mapped to a particular space-time stream using a mapping value that is different from the value used for mapping an adjacent data tone, then the pilot tone is excluded from the set of considered overlapping tones, in an embodiment. In embodiments in which a auto-correlation is performed based on the LTF1 field of a data unit and single stream pilots are mapped to multiple space-time streams using the first column the P matrix, as discussed above with respect to Equation xx, the data and pilot tones in the LTF1 field are mapped to multiple space-time streams using the same mapping value. Therefore, in this case pilot tones need not be excluded. Similarly, if multi-stream pilot tones are utilized, then the pilot tones are always mapped to a particular space-time stream using the same mapping value as the value used for mapping adjacent data tones, and the pilot tones need not be excluded from the set of considered overlapping tones. However, in some embodiments, some or all of the pilot tones that need not be excluded from the set of considered overlapping tones are nonetheless excluded due for other reasons.

In an example embodiment in which single stream pilot tones are not utilized in the LTF1 field of normal mode and/or low bandwidth mode data units, all overlapping pilot and data tones in both the normal mode and the low bandwidth mode data units are included in the set of considered overlapping tones. In another embodiment in which the LTF1 field includes single stream pilot tones, some or all of the pilot tones are not included in the set of considered overlapping tones. For example, pilot tones in a normal mode bandwidth tone map are excluded from the set of considered overlapping tones, in one embodiment. In this case, the set of overlapping data tones between a 1 MHz low bandwidth data unit and a 2 MHz normal mode data unit includes tones at tone indices [−12:8, −6:1, 1:6, 8:12], in an embodiment. In another embodiment, pilot tones in both low bandwidth tone plan and an normal mode tone plan are excluded from the set of considered overlapping tones. In this case, in an example embodiment in which pilot tones in a 1 MHz LTF1 field are located at tone indices [+/−7] (mapped to a lower side band or the upper sideband of a normal mode communication channel), and pilot tones in a 2 MHz LTF1 field are located at tone indices [+/−7 and +/−21], the set of overlapping tones includes tone indices [−12:−8, −6, −4:−1, 1:6, 8, 10:12] (mapped to a lower side band or the upper sideband of a normal mode communication channel). On the other hand, in an embodiment in which single stream pilot tones in LTF1 are mapped to multiple space time streams using the first row of the P matrix, the pilot tones are mapped to multiple space time streams using a mapping value that is different from the mapping value used for data tones of the LTF1 field, in at least some situations (e.g. when using four spatial streams). In this case, pilot tones in both low bandwidth tone map and the normal mode tone map are excluded from the set of considered overlapping tones, in an embodiment. In one such embodiment, the set of overlapping tones includes tone indices [−12:−8, −6, −4:−1, 1:6, 8, 10:12] (mapped to a lower side band or the upper sideband of a normal mode communication channel).

In general, cross-correlation value of zero cannot be achieved when an odd number of tones is included in the set of considered overlapping tones. In some embodiments, with or without pilot tone exclusions, one 1 MHz LTF1 data tone is excluded from the set of considered tones if the set of considered tones would have included an odd number of tones without this exclusion, such that an even number of overlapping tones is considered. In another embodiment, one 2 MHz LTF1 zeroed tone in each sub-band of the tone map 600 (e.g., tone index +/−29) is included in the set of considered tones if the set of considered tones would have included an odd number of tones without this inclusion, such that an even number of overlapping tones is considered.

The particular sub-channel of a wider normal mode channel in which auto-correlation is performed depends on the channelization utilized by the WLAN 10, in various embodiments and/or scenarios. In some embodiments, communication channels of a WLAN (e.g., WLAN 10 of FIG. 1) are defined based on normal mode signal bandwidths only, whereas low bandwidth mode signals (e.g., control mode signals, in an embodiment) are transmitted in one or more frequency bands within those communication channels. For example, the channelization on which medium access control (MAC) protocols operate corresponds to the set of channels used to transmit normal mode signals, in an embodiment. In a more specific example embodiment, where normal mode signals are transmitted in 2 MHz, 4 MHz, 8 MHz, or 16 MHz bandwidths (e.g., corresponding to data units generated using 64-point, 128-point, 256-point, or 512-point IDFTs), the defined channels are 2 MHz, 4 MHz, 8 MHz, or 16 MHz channels, and a low bandwidth mode signal having a 1 MHz bandwidth (e.g., corresponding to a data unit generated using a 32-point IDFT) is transmitted in a 1 MHz band within one of the 2 MHz channels. For example, in one embodiment a primary 2 MHz channel is defined, and a 1 MHz low bandwidth data unit is transmitted in a fixed sideband of the primary 2 MHz channel, such as in the LSB or in USB of the primary 2 MHz channel. In this case, a receiving device auto-detects the PHY mode of a data unit by considering certain overlapping tones within the LSB or the USB of the primary 2 MHz communication channel.

Alternatively, in another embodiment, communication channels of a WLAN (e.g., WLAN 10 of FIG. 1) are defined based on the lowest bandwidth of low bandwidth signals. For example, in an embodiment in which the lowest bandwidth of low bandwidth signals is 1 MHz, a 1 MHz primary channel is defined. In this embodiment, a wider bandwidth normal mode data unit is transmitted in a 2 MHz channel that includes the primary 1 MHz channel. For example, 2 MHz signals are transmitted in a communication channel having the 1 MHz primary channel as the LSB or the USB of the 2 MHz channel. In this case, a receiving device auto-detects the PHY mode of a data unit by considering certain overlapping tones within the primary 1 MHz communication channel.

In some embodiments where the low bandwidth mode frequency band is restricted to a particular (lower or upper) sideband of a normal mode channel, a receiver auto-detects the PHY mode based on the signal (or signal portion) detected in the frequency band, where the frequency band location is known a priori to the receiver. For example, in an embodiment, the receiver knows that a low bandwidth mode (e.g., control mode) signal will only be transmitted in a lower sideband of a normal mode channel. Accordingly, for purposes of auto-detecting the PHY mode (e.g., based on STF differences, etc.), the receiver only observes signals in the lower sideband of the channel, in this embodiment. Conversely, the receiver detects the bandwidth of different normal mode data units (e.g., 2 MHz, 4 MHz, 8 MHz, etc.) based on a signal field (e.g., an HTSIG field as used in IEEE 802.11n and IEEE 802.11ac), in an embodiment.

In some embodiments, a low bandwidth mode signal with an unbalanced number of guard tones (i.e., more guard tones at the upper/lower band edge than the lower/upper band edge, as in the example tone map 650 of FIG. 6B) may be transmitted in a frequency band that places the smaller number of guard tones at an edge of the communication channel in which a low bandwidth data unit is being transmitted. To increase the number of guard tones at the edge(s) of the channel, the tones of a low bandwidth mode signal (or of one or more frequency domain duplicates thereof) are in some embodiments reversed or shifted. Reversed and shifter tone plans used to increase the number of guard tones at edge(s) of a communication channel, according to some embodiments, are described in U.S. patent application Ser. No. 13/494,505.

In some embodiments, when tone map reversal or shifting is utilized, the LTF sequence values used to modulate the LTF1 field of a low bandwidth data unit remains the same as the LTF sequence values used to modulate the LTF1 field when no tone shifting or reversal is utilized. In this case, a common low bandwidth LTF sequence is utilized regardless of channel placement for low bandwidth data units. In some such embodiments, LTF sequence values used in normal mode do not utilize the LTF value sequence define in the corresponding short range communication protocol (e.g., the IEEE-802.11n Standard). Rather, a new LTF sequence to be used in normal mode is defined, in some such embodiments, to ensure that a suitably low cross-correlation value between the LTF sequence used in normal mode and the LTF sequence used in low bandwidth mode (when cross correlation is performed using a set of considered overlapping tones) is obtained regardless of the channel placement being utilized. In one embodiment, however, LTF sequence values used in normal mode utilize the LTF value sequence define in the corresponding short range communication protocol (e.g., the IEEE-802.11n Standard), and the low bandwidth LTF values are designed such that a suitably low cross-correlation value between the LTF sequence used in normal mode and the LTF sequence used in low bandwidth mode (when cross correlation is performed using a set of considered overlapping tones) is obtained regardless of the channel placement being utilized.

Figure 7:
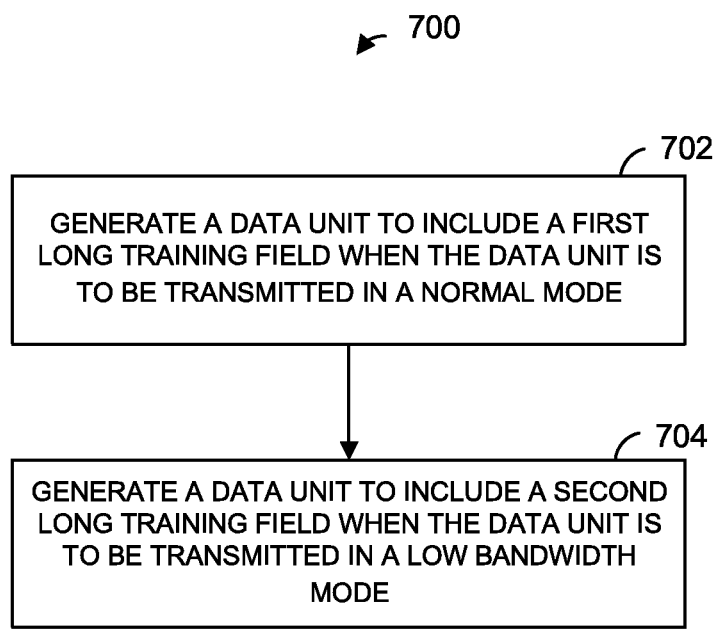
FIG. 7 is a flow diagram of an example method 700 for generating a data unit, according to an embodiment.

FIG. 7 is a flow diagram of an example method 700 for generating a data unit, according to an embodiment. With reference to FIG. 1, the method 700 is implemented by the network interface 16, in an embodiment. For example, in one such embodiment, the PHY processing unit 20 is configured to implement the method 700. According to another embodiment, the MAC processing 18 is also configured to implement at least a part of the method 700. With continued reference to FIG. 1, in yet another embodiment, the method 700 is implemented by the network interface 27 (e.g., the PHY processing unit 29 and/or the MAC processing unit 28). In other embodiments, the method 700 is implemented by other suitable network interfaces.

At block 702, a data unit to be transmitted in a normal mode is generated to include a first long training field. For example, the data unit 300 of FIG. 3A is generated, according to an embodiment. In another embodiment, another suitable data unit is generated. The data unit generated at block 702 includes the LTF1 field 304, in an embodiment.

At block 704, a data unit a data unit to be transmitted in a low bandwidth mode is generated to include a second long training field. For example, the data unit 350 of FIG. 3B is generated, according to an embodiment. In another embodiment, another suitable data unit is generated. The data unit generated at block 704 includes the LTF1 field 354, in an embodiment.

In an embodiment, the first training field included in the data unit generated at block 702 and the second long training field generated at block 704 are configured such that a receiving device can auto-detect whether the data unit is the normal mode data unit generated at block 702 or the low bandwidth data unit generated at block 704 based on the long training field (e.g., LTF1) included in the data unit. In an embodiment, the first long training field is generated according to a first tone map, and the second long training field is generated according to a second tone map. For example, the first training field is generated according to the tone map 600 of FIG. 6A and the second training field is generated according to the tome map 650 of FIG. 6B, according to one embodiment. In other embodiments, the first training field and/or the second training field are modulated according to other suitable tone maps. In any event, the LTF sequence values used to modulate a set of overlapping tones in the first tone map and the second tone map are configured to produce a suitably low cross-correlation value when cross-correlation is performed using the set of overlapping tones.

Figure 8:
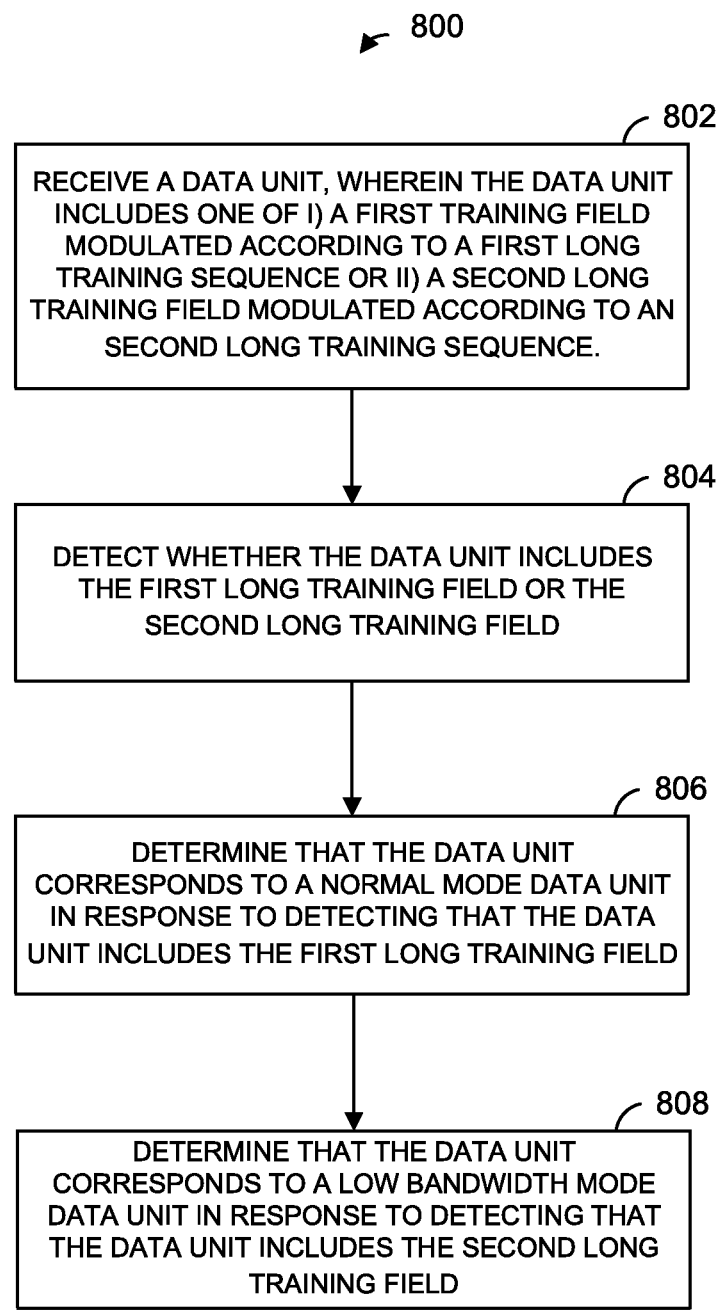
FIG. 8 is a flow diagram of an example method 800 for auto-detecting the PHY mode of a data unit, according to an embodiment.

FIG. 8 is a flow diagram of an example method 800 for auto-detecting the PHY mode of a data unit, according to an embodiment. With reference to FIG. 1, the method 800 is implemented by the network interface 16, in an embodiment. For example, in one such embodiment, the PHY processing unit 20 is configured to implement the method 800.

According to another embodiment, the MAC processing 18 is also configured to implement at least a part of the method 800. With continued reference to FIG. 1, in yet another embodiment, the method 800 is implemented by the network interface 27 (e.g., the PHY processing unit 29 and/or the MAC processing unit 28). In other embodiments, the method 700 is implemented by other suitable network interfaces.

At block 802, a data unit is received. The data unit includes one of i) a first long training field modulated according to a first long training sequence or ii) a second long training field modulated according to a second long training sequence. As an example, in an embodiment, the data unit 300 of FIG. 3A is received or the data unit 350 of FIG. 350 is received ate block 802. When the data unit is the data unit 300, then the data unit includes the LTF1 304, which is modulated according to the first LTF sequence. On the other hand, when the received data unit is the data unit 350, then the data unit includes the LTF1, which is modulated according to the second LTF sequence. In other embodiments, another suitable data unit having either a first long training field or a second long training field is received at block 802.

At block 804, it is detected whether the data unit includes the first training field or the second training field. For example, cross-correlations over one or more OFDM symbols of the long training field with the first LTF sequence and the second LTF sequence are performed using a set of considered overlapping tones in a frequency range in which a channel used for transmission of normal mode data units overlaps with the channel used for transmission of low bandwidth data units, in an embodiment. In this embodiment, detection at block 804 is performed by detecting which of the two cross-correlations produces a higher result.

At block 806, in response to detecting that the data unit includes the first long training field, it is determined that the data unit corresponds to a normal mode data unit. Alternatively, in response to detecting, at block 806, that the data unit includes the second long training field, it is determined that the data unit corresponds to a low bandwidth data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method for generating a physical layer (PHY) data unit for transmission via a communication channel, the method comprising:
   generating the data unit to include a first long training field when the data unit is to be transmitted in a normal mode, wherein the normal mode corresponds to a first channel bandwidth; and
   generating the data unit to include a second long training field when the data unit is to be transmitted in a low bandwidth mode, wherein the low bandwidth mode corresponds to a second channel bandwidth that is smaller than the first channel bandwidth, wherein the first long training field and the second long training field are configured to have a low cross-correlation value when cross-correlation is performed using at least some overlapping orthogonal frequency division multiplexing (OFDM) tones in the first long training field and the second long training field such that a receiving device can auto-detect whether the data unit corresponds to the low bandwidth mode or the normal mode.

2. The method of claim 1, wherein:

generating the data unit to include the first long training field comprises using a first tone map having a first set of OFDM tones, wherein the first set of OFDM tones includes i) a first set of data tones, and ii) a first set of pilot tones;

generating the data unit to include the second training field comprises utilizing a second tone map having a second set of OFDM tones, wherein the second set of OFDM tones includes i) a second set of data tones and ii) a second set of pilot tones; and the first training field and the second training field are configured to have the low cross-correlation value when cross-correlation is performed using a set of considered overlapping tones within the first tone map and the second tone map.

3. The method of claim 2, wherein the set of considered overlapping tones excludes one or more of i) the first set of pilot tones, ii) the second set of pilot tones, iii) some but not all data tones in the first set of data tones, and iv) some but not all data tones in the second set of data tones.

4. The method of claim 2, wherein:

the first set of OFDM tones further includes a first set of zeroed tones;

the second set of OFDM tones further includes a second set of zeroed tones; and the set of considered overlapping tones includes one or more of i) one or more zeroed tones in the first set of zeroed tones and ii) one or more zeroed tones in the second set of zeroed tones.

5. The method of claim 2, wherein the set of considered overlapping tones includes an even number of tones.

6. An apparatus for generating a physical layer (PHY) data unit for transmission via a communication channel, the apparatus comprising:

a network interface configured to generate the data unit to include a first long training field when the data unit is to be transmitted in a normal mode, wherein the normal mode corresponds to a first channel bandwidth, and generate the data unit to include a second long training field when the data unit is to be transmitted in a low bandwidth mode, wherein the low bandwidth mode corresponds to a second channel bandwidth that is smaller than the first channel bandwidth, wherein the first long training field and the second long training field are configured to have a low cross-correlation value when cross-correlation is performed using at least some overlapping orthogonal frequency division multiplexing (OFDM) tones in the first long training field and the second long training field such that a receiving device can auto-detect whether the data unit corresponds to the low bandwidth mode or the normal mode.

7. The apparatus of claim 6, wherein the network interface is configured to:

generate the data unit to include the first long training field comprises using a first tone map having a first set of OFDM tones, wherein the first set of OFDM tones includes i) a first set of data tones, and ii) a first set of pilot tones;

generate the data unit to include the second training field comprises utilizing a second tone map having a second set of OFDM tones, wherein the second set of OFDM tones includes i) a second set of data tones and ii) a second set of pilot tones; and wherein the first training field and the second training field are configured to have the low cross-correlation value when cross-correlation is performed using a set of considered overlapping tones within the first tone map and the second tone map.

8. The apparatus of claim 7, wherein the set of considered overlapping tones excludes one or more of i) the first set of pilot tones, ii) the second set of pilot tones, iii) some but not all data tones in the first set of data tones, and iv) some but not all data tones in the second set of data tones.

9. The apparatus of claim 8, wherein the set of considered overlapping tones includes an even number of tones.

10. The apparatus of claim 7, wherein:

the first set of OFDM tones further includes a first set of zeroed tones;

the second set of OFDM tones further includes a second set of zeroed tones; and the set of considered overlapping tones includes one or more of i) one or more zeroed tones in the first set of zeroed tones and ii) one or more zeroed tones in the second set of zeroed tones.

11. A method comprising:

receiving a data unit, wherein the data unit includes one of i) a first training field modulated according to a first long training sequence or i) a second training field modulated according to a second training sequence;

detecting whether the data unit includes the first training field or the second training field, wherein the first training field and the second training field are configured to have a low cross-correlation value when cross-correlation is performed using at least some overlapping orthogonal frequency division multiplexing (OFDM) tones in the first long training field and the second long training field;

determining that the data unit corresponds to a normal mode data unit in response to detecting that the data unit includes the first training field; and determining that the data unit corresponds to a low bandwidth mode data unit in response to detecting that the data unit includes the second training field, wherein the low bandwidth mode corresponds to a first channel bandwidth that is smaller than a second channel bandwidth corresponding to the normal mode.

12. The method of claim 11, wherein:

the first training field is modulated according to a first tone map having a first set of OFDM tones, wherein the first set of OFDM tones includes i) a first set of data tones, and ii) a first set of pilot tones;

the second training field is modulated according to a second tone map having a second set of OFDM tones, wherein the second set of OFDM tones includes i) a second set of data tones and ii) a second set of pilot tones; and detecting whether the data unit includes the first training field or the second training field comprises performing cross-correlation using a set of considered overlapping tones within the first tone map and the second tone map.

13. The method of claim 12, wherein the set of considered overlapping tones excludes one or more of i) the first set of pilot tones, ii) the second set of pilot tones, iii) some but not all data tones in the first set of data tones, and iv) some but not all data tones in the second set of data tones.

14. The method of claim 12, wherein:
the first set of OFDM tones further includes a first set of zeroed tones;
the second set of OFDM tones further includes a second set of zeroed tones; and
the set of considered overlapping tones includes one or more of i) one or more zeroed tones in the first set of zeroed tones and ii) one or more zeroed tones in the second set of zeroed tones.

15. The method of claim 12, wherein the set of considered overlapping tones includes an even number of tones.

16. An apparatus comprising:
a network interface configured to
receive a data unit, wherein the data unit includes one of i) a first training field modulated according to a first long training sequence or i) a second training field modulated according to a second training sequence,
detect whether the data unit includes the first training field or the second training field, wherein the first training field and the second training field are configured to have a low cross-correlation value when cross-correlation is performed using at least some overlapping orthogonal frequency division multiplexing (OFDM) tones in the first long training field and the second long training field,
determine that the data unit corresponds to a normal mode data unit in response to detecting that the data unit includes the first training field, and
determine that the data unit corresponds to a low bandwidth mode data unit in response to detecting that the data unit includes the second training field,
wherein the low bandwidth mode corresponds to a first channel bandwidth that is smaller than a second channel bandwidth corresponding to the normal mode.

17. The apparatus of claim 16, wherein:
the first training field is modulated according to a first tone map having a first set of OFDM tones, wherein the first set of OFDM tones includes i) a first set of data tones, and ii) a first set of pilot tones;
the second training field is modulated according to a second tone map having a second set of OFDM tones, wherein the second set of OFDM tones includes i) a second set of data tones and ii) a second set of pilot tones; and
the network interface is configured to detect whether the data unit includes the first training field or the second training field at least by performing cross-correlation using a set of considered overlapping tones within the first tone map and the second tone map.

18. The apparatus of claim 17, wherein the set of considered overlapping tones excludes one or more of i) the first set of pilot tones, ii) the second set of pilot tones, iii) some but not all data tones in the first set of data tones, and iv) some but not all data tones in the second set of data tones.

19. The apparatus of claim 17, wherein:
the first set of OFDM tones further includes a first set of zeroed tones;
the second set of OFDM tones further includes a second set of zeroed tones; and
the set of considered overlapping tones includes one or more of i) one or more zeroed tones in the first set of zeroed tones and ii) one or more zeroed tones in the second set of zeroed tones.

20. The apparatus of claim 17, wherein the set of considered overlapping tones includes an even number of tones.

* * * * *